Sept. 3, 1968  C. J. MATHEY  3,400,232
MULTIPLE FUNCTION CIRCUIT CONTROLLER AND CIRCUIT
Filed Sept. 30, 1966  3 Sheets-Sheet 1
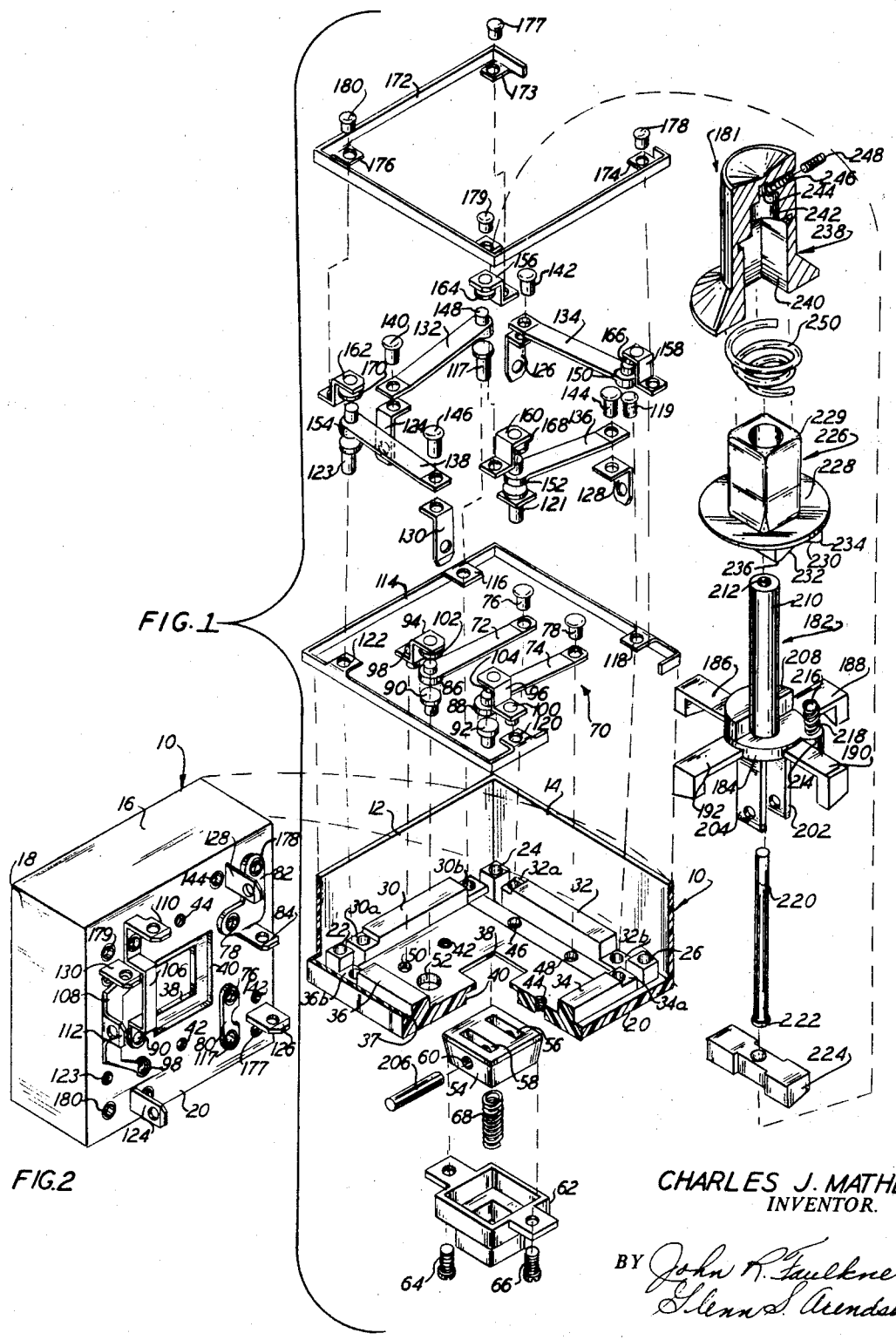
CHARLES J. MATHEY
INVENTOR.
BY John R. Faulkner
Glenn S. Arendsen
ATTORNEYS Sept. 3, 1968 C. J. MATHEY 3,400,232
MULTIPLE FUNCTION CIRCUIT CONTROLLER AND CIRCUIT
Filed Sept. 30, 1966 3 Sheets-Sheet 2

CHARLES J. MATHEY
INVENTOR.

BY John R. Faulkner
Glenn S. Arendsen
ATTORNEYS

United States Patent Office 3,400,232
Patented Sept. 3, 1968

3,400,232
MULTIPLE FUNCTION CIRCUIT CONTROLLER
AND CIRCUIT
Charles J. Mathey, Dearborn, Mich., assignor to Ford
Motor Company, Dearborn, Mich., a corporation of
Delaware
Filed Sept. 30, 1966, Ser. No. 583,249
13 Claims. (Cl. 200—18)

ABSTRACT OF THE DISCLOSURE

This circuit controller serves efficiently as a master switch for the power windows of a motor vehicle. Primary switches for operating the window motors are located around the inside periphery of a switch housing and secondary switches for reversing the polarity at the primary switches are located on the floor of the housing. A wand projecting from the housing pivots a cross shaped member to move arms into touch with individual primary switches or any two adjacent primary switches, thereby actuating motors controlled by the switches to raise the associated windows. Depressing a knob on the wand simultaneously with the above pivoting actuates the secondary switches to reverse the polarity at the primary switches and thereby lower the appropriate window. Cams on a member rotatable by rotation of the knob in one direction actuate all primary switches concomitantly to raise all the windows and, with depression of the knob described above, to lower all the windows. A pin actuated by rotation of the knob in the opposite direction acts on one of the secondary switches to disconnect the primary switches from the power source, thereby preventing accidental actuation of the master switch and, with the disclosed circuitry, also preventing unauthorized actuation of switches mounted for use by the occupant of the seat near each window.

---

This invention provides a circuit controller capable of performing a variety of parallel and series switching functions individually and concomitantly and a circuit for utilizing the controller. One important use of the controller is as a master switch for the power windows of an automobile.

Most master switches for power windows used commercially in the past were merely an aggregation of separate switches arranged in a single panel. The panel necessarily was located where it could be operated conveniently by the driver of the vehicle. Because of its bulk, the panel usually was mounted in the driver's door, where it was inaccessible by other front seat passengers. In vehicles having two front seats separated by a console, the panel occasionally was mounted in the console where it was accessible by both front seat passengers, but in this location the size of the panel preempted space useful for other equipment such as radios, storage compartments, and safety padding.

The circuit controller of this invention combines the switches previously placed in the bulky panel in a compact housing where a single wand actuates each switch individually or several combinations of switches concomitantly, the term "concomitantly" being used herein to mean that the switches are actuated by an integral movement but are not necessarily actuated simultaneously. In addition, other switching operations not provided previously are incorporated in the controller. The controller comprises a housing having a plurality of primary switches, each having a switch pole movable to complete and break a circuit mounted therein. A cross-shaped member having arms adapted to move the switch poles is mounted in the housing. A wand projects from the housing and pivots so movement thereof toward a primary switch moves an arm of the cross-shaped member to actuate that switch.

In refined versions of the controller the primary switches are electrically in parallel with each other and are mounted at the inside periphery of the housing. A typical housing is square shaped and contains four primary switches, one along each wall. Each primary switch is associated with a motor for operating one of the four side windows of a typical vehicle. If desired, a five sided housing containing five primary switches where the fifth switch is associated with a motor for actuating the tailgate of a station wagon or other housing shapes and numbers of primary switches can be provided.

Secondary switches electrically in series with the primary switches can be mounted at the floor of the housing and the wand can be designed so axial movement thereof actuates the secondary switches. The secondary switches reverse the polarity at the primary switches. Pivotal movement of the wand concomitant with the axial movement actuates a primary switch. Thus, with minimum activity, a window is selected and raised or lowered.

Cam means can be provided so rotation of a knob on the wand cams the cross-shaped member downward to actuate concomitantly all of the primary switches. In addition, a second cam means can be provided so rotation of the knob in the opposite direction acts on the secondary switches to disconnect the controller from the power source. With the circuitry also provided by this invention this disconnection will prevent window operation by the individual switches mounted proximately to each window.

The drawings show a controller of this invention having a four sided housing with four primary switches that is designed to actuate motors controlling the power windows of a vehicle. In the drawings, FIGURE 1 is an exploded view showing the housing and the switches in the left column and the wand in the right column;

FIGURE 2 is a bottom view of the housing showing the terminals used to connect the switch into an electrical circuit;

Figure 5:
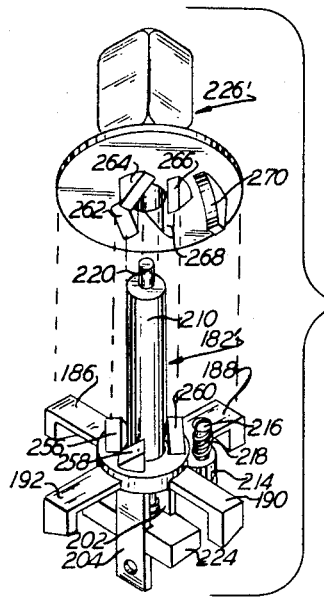
Figure 6:
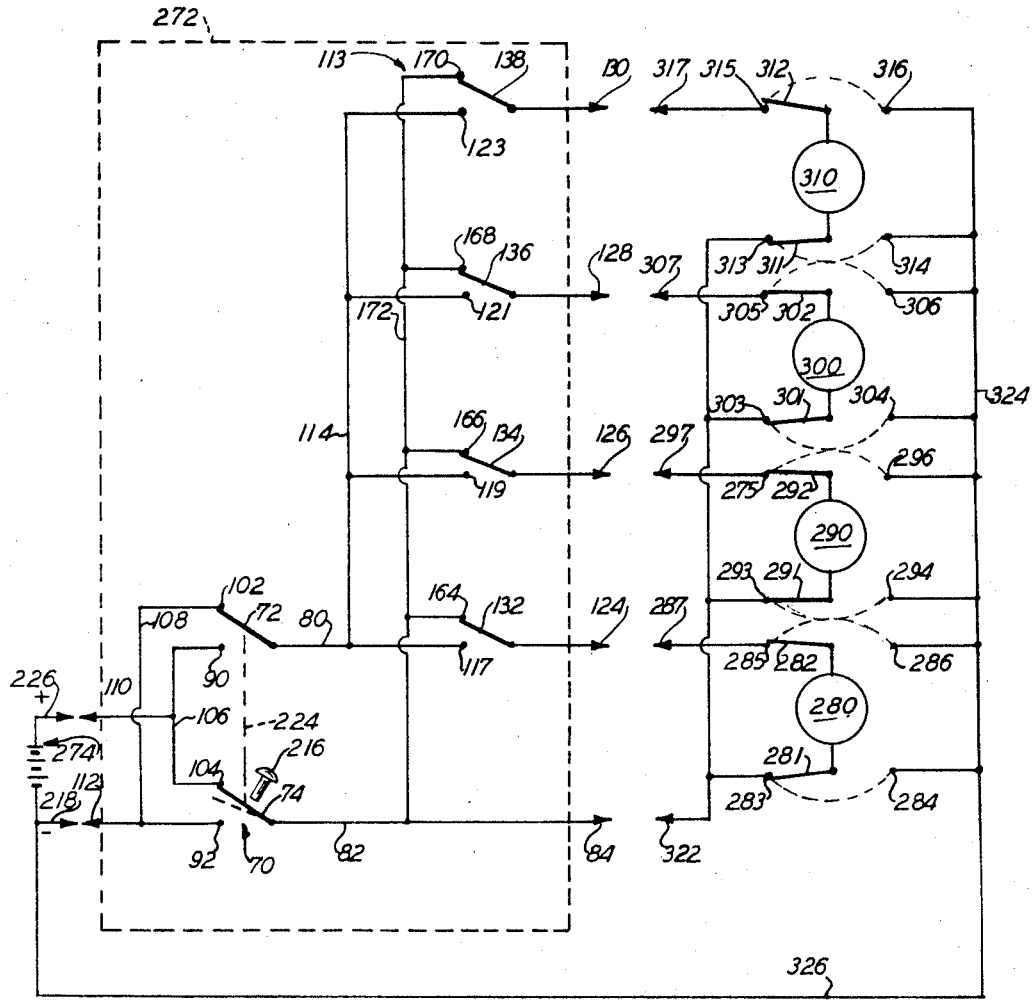

FIGURE 5 is an exploded view of an alternate wand construction in which rotation of a knob of the wand in one direction actuates all primary switches concomitantly and rotation in the other direction prevents the controller and any switches located proximate to the window from operating the window motors; and FIGURE 6 is a diagram of a circuit using the controller and proximately located switches to operate power window motors.

Figure 3:
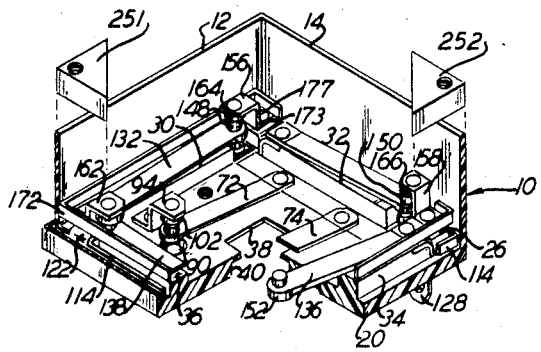
FIGURE 3 is a perspective sectional view of the housing with the switch components assembled in place.

Referring primarily to FIGURES 1, 2 and 3, the housing for the circuit controller of this invention is indicated generally by the numeral 10 and comprises four upstanding walls 12, 14, 16 and 18 mounted squarely on a floor 20. Floor 20 has a raised block 22, 24 and 26 in each corner (the fourth block is not shown in the drawings because of the cutout). The blocks are inward slightly from walls 12, 14, 16 and 18 so a narrow space exists between each block and the walls. Each block has a hole extending through floor 20.

Raised lands 30, 32, 34 and 36 are located on floor 20 along each wall. Like the raised blocks, the raised lands are inward from the walls so a narrow space (e.g., numeral 37 in FIGURE 1) exists therebetween. Each land has a high step 30a, 32a and 34a (36a is not shown because of the cutout) at one end and a low step 30b, 32b and 36b (34b is not shown because of the cutout) at the other end. Each step also has a hole extending through floor 20, and a slot (not shown) for a space-type terminal is formed in floor 20 between each high step and the adjacent block.

A square opening 38 is cut in the middle of floor 20. Opening 38 is stepped to form an opening 40 at the bottom side of floor 20 that is larger than opening 38 at the top side. Threaded holes 42 and 44 are formed in floor 20 on each side of opening 38. Adjacent land 32, holes 46 and 48 are cut into floor 20 and on the opposite side of opening 38, four additional holes, only two numbered 50 and 52 of which are shown because of the cutout portion of the drawings, are located in a line parallel to land 36. Ordinarily, housing 10 with the above construction features is molded as a unit from any of the electrically insulating plastics.

Referring to the portion of FIGURE 1 below housing 10, a rocker block 54 having two parallel vertical slots 56 and 58 therein and a horizontal hole 60 intersecting both slots is adapted to fit loosely in opening 40. Slots 56 and 58 are subtended by opening 38, and the sides of block 54 are tapered slightly inward at the bottom. A case 62 loosely surrounds block 54 and is fastened to housing 10 by screws 64 and 66 threaded into holes 42 and 44, respectively. Block 54 and case 62 also are made of plastic. Compression spring 68 seats in case 62 and urges block 54 upward into opening 40.

The secondary switch means is indicated generally in FIGURE 1 by the numeral 70. FIGURES 2 and 3 also show some of the parts of the secondary switch means, although these parts are designated therein by their respective numbers. Secondary switch means 70 comprises two switch poles 72 and 74 mounted on floor 20 by rivets 76 and 78 passing through holes 46 and 48, respectively. Rivets 76 and 78 emerge at the bottom of floor 20 (see FIGURE 2) where rivet 76 fastens flat lug 80 and rivet 78 fastens L-shaped lug 82 to housing 10. L-shaped lug 82 has a spade-type terminal 84 projecting therefrom.

Electrical contacts 86 and 88 are located at the other end of poles 72 and 74, respectively. Mounted in hole 52 and its associated hole (not shown) in floor 20 below contacts 86 and 88 are contacts 90 and 92, respectively. Stepped mounting members 94 and 96 are attached to floor 20 by rivets 98 and 100 passing through hole 50 and its associated hole (not shown) and position contacts 102 and 104 above contacts 86 and 88, respectively. Poles 72 and 74 are formed so contacts 86 and 88 normally are in touch with contacts 102 and 104 but are movable by a slight downward force out of touch therewith and into touch with contacts 90 and 92.

Rivet 100 and the rivet connected to contact 90 fasten stepped lug 106 shown in FIGURE 2 to the bottom of housing 10. Similarly, rivet 98 and the rivet connected to contact 92 fasten C-shaped lug 108 to the bottom of housing 10. Lugs 106 and 108 carry respective projecting spade-type terminals 110 and 112.

The primary switch means are indicated generally in FIGURE 1 by the numeral 113. As with secondary switch means 70, parts of the primary switch means shown in FIGURES 2 and 3 are designated therein by their respective numbers. Primary switch means 113 comprise a lower buss bar 114 fitting into the space (e.g., numeral 37) along the walls and extending around three sides and part of the fourth side of housing 10. Buss bar 114 has four tabs 116, 118, 120 and 122 that rest on lower steps 30b, 32b, etc. Contacts 117, 119, 121 and 123 have connected rivets passing through holes in tabs 116, 118, 120 and 122 and the holes in steps 30b, 32b, etc., respectively. The rivet connected to contact 117 anchors in lug 80 on the bottom side of floor 20 while the rivets of contacts 119 through 123 anchor only in floor 20.

Four L-shaped terminals 124, 126, 128 and 130 seat respectively on higher steps 30a, 32a, etc., with their terminal portions passing through the slots in floor 20 between higher step 30a and block 22, higher step 32a and block 24, etc. Note the emergence of the terminals at the bottom of housing 10 in FIGURE 2.

Switch poles 132, 134, 136 and 138 are fastened by rivets 140, 142, 144 and 146 to terminals 124, 126, 128 and 130, respectively, and to floor 20 so the poles lie above lands 30, 32, 34 and 36. The opposite ends of poles 132 through 138 have contacts 148, 150, 152 and 154 thereon that are positioned above contacts 117, 119, 121 and 123, respectively.

Stepped mounting members 156, 158, 160 and 162 seat on blocks 24, 26, the block not shown, and block 22 to position contacts 164, 166, 168 and 170 above contacts 148, 150, 152 and 154, respectively. An upper buss bar 172 has tabs 173, 174, 175 and 176 seating on the lower step of mounting members 156 through 162, respectively. Rivets 177, 178, 179 and 180 pass through tabs 173 through 176, members 156 through 162 and through floor 20 to fasten buss bar 172 and the stepped mounting members in place. Rivet 178 anchors in lug 82 at the bottom of floor 20 (see FIGURE 2), while rivets 177, 179 and 180 simply anchor in floor 20.

Mounting members 156 through 162 position respective contacts 164 through 170 above respective contacts 148 through 154, and poles 132 through 138 are formed so contacts 148 through 154 normally touch contacts 164 through 170 but are movable to touch contacts 117 through 123 instead. Each of elements 72 through 180 is made of an electrically conducting material.

In FIGURE 1, a wand assembly for the controller is indicated generally by the numeral 181. The heart of wand assembly 181 is the cross-shaped member indicated generally by the numeral 182. Cross-shaped member 182 is made of a plastic disc 184 having four arms 186, 188, 190 and 192 extending at right angles from its periphery. Arms 186 through 192 have downwardly extending blocks located at their ends.

Below disc 184, two parallel legs 202 and 204 project downward for a short distance. Legs 202 and 204 are designed to fit into slots 56 and 58 in rocker block 54. Holes that will line up with hole 60 in block 54 are formed in legs 202 and 204, and a pin 206 passes through the holes to maintain assembly of member 182 and rocker block 54.

A semicircular stop 208 is mounted on top of disc 184 and a cylindrical shank 210 projects axially upward from disc 184. Shank 210 contains a passage 212 extending axially therethrough and through disc 184. A projection 214 having a hole therein is attached to the periphery of disc 184 between arms 188 and 190. Cross-shaped member 182 with elements 184 through 214 is made of an electrically insulating material such as one of the many plastics and usually is formed by molding.

A pin 216 is slidable in the hole in projection 214 and is spring loaded by a spring 218 to an upward position. Slidable in passage 212 is a rod 220 having a head 222 at its lower end. Rod 220 is long enough to project for a short distance from the upper end of shank 210.

A plastic actuating block 224 is mounted slidably between legs 202 and 204. In the assembled position, block 224 is located just above poles 72 and 74 of secondary switch means 70. Downward movement of rod 220 moves block 224 which in turn moves poles 72 and 74 so contacts 86 and 88 move out of touch with contacts 102 and 104 and into touch with contacts 90 and 92, respectively. When downward force on rod 220 is released, the resilience in poles 72 and 74 moves block 224 upward and returns contacts 86 and 88 to their rest position where they again touch contacts 102 and 104.

A camming member 226 is mounted rotatably on the outer diameter of shank 210. Member 226 has a disc 228 at its lower end and a square-shaped portion 229 extending above the disc. The bottom of disc 228 has inclined surfaces 230 and 232 extending away from each other and running into flat surfaces 234 and 236, respectively.

Pin 216 locates between inclined surfaces 230 and 232 and is cammed downward by sliding on the inclined surfaces when member 226 is rotated in either direction. Rotating member 226 until pin 216 is riding on flat surface 234 or 236 produces a static condition in which pin 216 is held in its downward position. When members 182 and 226 are assembled in housing 10, pin 216 in its downward position moves pole 74 to an intermediate position out of touch with contacts 92 and 104.

The wand assembly is topped by a knob 238. A square-shaped opening 240 extends a short distance into knob 238 from the bottom thereof. Above opening 240 is a circular opening 242 extending a short distance further into knob 238 and above opening 242 is a smaller circular opening 244 extending still further into knob 238. A threaded radial passage 246 opens on opening 244 and the outside of knob 238 and a set screw 248 is mounted threadably therein.

Opening 240 receives square-shaped portion 229 of member 226. Similarly, shank 210 fits into opening 242 and the upper tip of rod 220 fits into opening 244 where it is secured by tightening set screw 248. A tapered compressive spring 250 seats at its larger end on the shoulder between openings 240 and 242 and bears on the top of square-shaped portion 229. When assembled, a short space exists between the top of portion 229 and the shoulder between openings 240 and 242, and between the top of shank 210 and the shoulder between openings 242 and 244.

Figure 4:
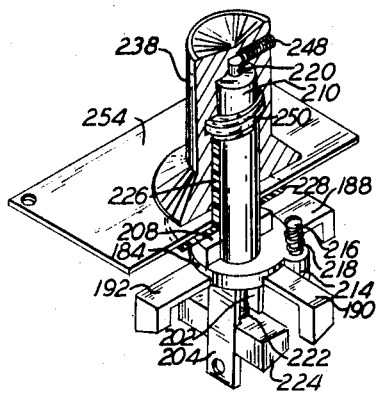
FIGURE 4 is a perspective sectional view of the wand assembly.

Triangular-shaped blocks 251 and 252 shown in FIGURE 3 are bonded in opposing upper corners of the square formed by walls 12 through 18. A cover plate 254 shown in FIGURE 4 then is mounted on top of housing 10 by appropriate threaded fasteners (not shown) passing through openings in plate 254 and threading into holes in blocks 251 and 252. Plate 254 rests on top of disc 228 as shown in FIGURE 4.

General mechanical operation of the circuit controller takes place in the following manner. Wand assembly 181 is capable of pivoting through the action of rocker block 54. Pivotal movement toward any one of poles numbered 132 through 138 brings the block of appropriate arm 186 through 192 into contact with the pole and thereby moves the pole out of touch with appropriate contacts 164 through 170 and into touch with appropriate contacts 117 through 123. Pivotal movement toward an intermediate position between any two adjacent poles 132 through 138 brings both appropriate adjacent arms 186 through 192 into contact with the poles to actuate concomitantly the adjacent primary switch means. When the pivoting force on the wand assembly is removed, spring 68 moves the wand assembly back to a neutral upright position.

Pressing knob 238 downward slides rod 220 in cross-shaped member 182, moving block 224 into poles 72 and 74 and thereby moving contacts 86 and 88 out of touch with contacts 102 and 104 and into touch with contacts 90 and 92, respectively. Then pivoting wand assembly 181 as described in the preceding paragraph concomitantly actuates one or two primary switch means.

FIGURE 5 shows an alternate construction of members 182 and 184 that provide means for actuating all primary switch means concomitantly. In this alternate construction, stop 208 on the top of disc 184 is replaced by four evenly spaced inclined members 256, 258 and 260, the fourth inclined member being hidden behind shank 210. These inclined members have their inclined surfaces running in the same circumferential direction. Cam carrying member 226' then has four inclined members 262, 264, 266 and 268 mounted on the bottom of disc 228. The inclined surfaces of members 262 through 268 slide on the inclined surfaces of members 256, 258, etc.

Radially outward of members 262 through 268 is a single inclined member 270 having its inclined surface running in a direction opposite to that of members 262 through 268. The inclined surface of member 270 is positioned to contact pin 216. Other parts in the wand assembly are unchanged.

With the alternate construction, rotating knob 238 counterclockwise rotates member 226' so members 262 through 268 act through members 256, 258, etc., to cam cross-shaped member 182' downward so arms 186 through 192 actuate all primary switch means concomitantly. Rotating knob 238 clockwise acts through member 270 to cam pin 216 into pole 74 as described above. In this alternate construction, sufficient clearance must be provided, of course, in case 62 for slight lateral movement of block 54.

In describing the circuit in FIGURE 6, the numerals used to designate parts in the controller also will designate the portions of the circuit those parts represent. The portion of the circuit contained in the circuit controller is enclosed by dotted line 272. A direct current source such as a battery 274 has its positive terminal 276 connected to terminal 110 and its negative terminal 278 connected to terminal 112. Within controller 272 stepped lug 106 transmits the positive potential to contacts 90 and 104 and C-shaped lug 108 transmits the negative potential to contacts 92 and 102. Pole 72 normally touches contact 102 and pole 74 normally touches contact 104 but these arms are movable to contacts 90 and 92 concomitantly by block 224 represented in FIGURE 6 by a dotted line. Pin 216 is positioned above pole 74 and is capable of moving that pole to the intermediate position represented by the dotted line just below the pole.

Lug 80 connects pole 72 with lower buss bar 114 and contact 117. Lug 82 connects pole 74 with upper buss bar 172 and terminal 84. Buss bar 114 connects with contacts 119, 121 and 123 and buss bar 172 connects with contacts 164, 166, 168 and 170. Poles 132, 134, 136 and 38 of primary switch means normally touch contacts 164, 166, 168 and 170, respectively, but are movable to contacts 117, 119, 121, and 123, respectively. Terminals 124, 126, 128 and 130 connect with poles 132, 134, 136 and 138, respectively.

Electric motors 280, 290, 300 and 310 have their output shafts connected to appropriate gearing for operating the windows of a vehicle. For purposes of illustration, motor 280 will be treated as if it operates the left front window, motor 290 operates the right front window, motor 300 operates the right rear window, and motor 310 operates the left rear window.

The poles 281 and 282 of two single pole double throw switches are connected to the leads of motor 280. Pole 281 normally touches a contact 283 but can be thrown to a contact 284, and pole 282 normally touches a contact 285 but can be thrown to a contact 286. Similarly, poles 291 and 292 of two single pole double throw switches are connected to the leads of motor 290. Pole 291 normally touches contact 293 but can be thrown to contact 294, and pole 292 normally touches contact 295 but can be thrown to touch contact 296. Similar poles 301, 302, 311 and 312 and contacts 303 through 306 and 313 through 316 are associated with motors 300 and 310.

Contact 285 is connected to a terminal 287 that connects with terminal 124 of the circuit controller. Similarly, contact 295 is connected to a terminal 297 that connects with terminal 126, contact 305 is connected to terminal 307 that connects with terminal 128, and contact 315 is connected to a terminal 317 that connects with terminal 130. A buss line 320 connects contacts 283, 293, 303 and 313 with a terminal 322 that connects with terminal 84. Another buss line 324 connects contacts 284, 286, 294, 296, 304, 306 and 314 and 316 through an external conductor 326 to negative terminal 278 of battery 274.

With each switch pole, including those in controller 272, in its normal position, poles 281 and 282 apply a positive potential to both sides of motor 280 so no motor operation takes place. Note that the normal position of the switch poles always equalizes the potential across the motors instead of simply disconnecting one side of the motor; this provides dynamic motor braking and improves motor life.

Assume that poles 281 and 282 are in their normal positions and pole 132 is moved to contact 117. This applies negative battery potential to pole 282. With a positive potential at pole 281 and a negative potential at pole 282, motor 280 operates to raise the left front window. With pole 132 still in touch with contact 117, depressing block 224 to move poles 72 and 74 into touch with contacts 90 and 92, respectively, reverses the potential at poles 281 and 282, thereby reversing the operation of motor 280 to lower the left front window. Similar operation of poles 134, 136 and 138 results in similar operation of motors 290, 300 and 310.

Assume now that the poles in circuit controller 272 are in their normal position and the occupant of the seat next to the left rear window (motor 310) desires to change the position of his window. Again, with poles 311 and 312 in normal positions, a positive potential is applied to both sides of motor 310. Moving pole 312 to contact 316, however, applies a negative potential to pole 312 and motor 310 operates to raise the left rear window. Releasing pole 312 so it returns to its normal position in touch with contact 315 and moving pole 311 to contact 314 applies a positive potential to pole 312 and a negative potential to pole 311 so motor 310 operates to lower the window. Similar operations, of course, can be effected by the occupants of seats adjacent each of the other windows. Note that the individual switches containing poles 281, 282, 291 and 292 for operating the left and right front windows, respectively, can be eliminated when circuit controller 272 is accessible by both front seat passengers.

Depressing pin 216 moves pole 74 to an intermediate position where it does not touch either contact 92 or 104. This cuts off the potential at contacts 164, 166, 168 and 170 in circuit controller 272 and contacts 283, 293, 303 and 313 in the individual switches. Moving pole 311 to contact 314 applies a negative potential to pole 311 but does not produce motor operation because of the incomplete circuit from pole 312 to the other side of battery 274. A similar situation exists if pole 312 is moved to contact 316. Thus motor 310 cannot be operated by the individual switches located at the window or, for that matter, by pivotal movement of wand assembly 181. Through the use of pin 216, the vehicle driver easily prevents undesired operation of the windows.

Thus, this invention provides a circuit controller capable of actuating a plurality of primary switches in parallel with each other individually or concomitantly. The controller also can contain secondary switches in series with the primary switches and can actuate the secondary switches individually or concomitantly with the primary switches. An electrical circuit using the circuit controller as the remotely located master controller for operating a plurality of individual motors, each motor having individual switches proximately located, also is provided by this invention. Obvious safety advantages flow from the means in the controller and the circuit for preventing undesired operation of the motors by the proximately located switches.

What is claimed is:
1. A circuit controller comprising:
  a housing,
  a plurality of primary switch means mounted at the interior periphery of said housing, each of said primary switch means including a switch pole movable to complete and break a circuit,
  secondary switch means mounted on the floor of said housing,
  a cross-shaped member having arms adapted to move said switch poles, and
  a wand projecting from said housing, said wand being movable pivotally to move said cross-shaped member so each arm actuates a primary switch means individually, said wand having a rod axially slidable relative to the cross shaped member to actuate said secondary switch means.

2. The controller of claim 1 in which the secondary switch means reverses the polarity at the primary switch means.

3. The controller of claim 2 in which said wand is movable pivotally to an intermediate position where adjacent arms of the cross-shaped member actuate adjacent primary switch means concomitantly.

4. A circuit controller comprising:
  a housing,
  a plurality of primary switch means mounted at the interior periphery of said housing, each of said primary switch means including a switch pole movable to complete and break a circuit,
  secondary switch means mounted on the floor of said housing, said secondary switch means reversing the polarity at the primary switch means,
  a cross-shaped member having arms adapted to move said switch poles,
  a wand projecting from said housing and being movable pivotally to move said cross-shaped member so each arm actuates a primary switch means individually, said wand also being movable pivotally to an intermediate position where adjacent arms of the cross-shaped member actuate adjacent primary switch means concomitantly, said wand having a rod axially slidable relative to the cross-shaped member to actuate said secondary switch means, and
  cam means for moving the cross-shaped member to actuate all primary switch means concomitantly.

5. The controller of claim 4 in which the cam means comprises a cam rotatable relative to the cross-shaped member, said cam contacting the cross-shaped member to move the arms thereof to actuate the primary switch means.

6. The controller of claim 5 comprising means acting on the secondary switch means for disconnecting the primary switch means.

7. The controller of claim 1 comprising means for moving the cross-shaped member to actuate all primary switch means concomitantly.

8. A circuit controller comprising:
  a housing,
  a plurality of primary switch means mounted at the interior periphery of said housing, each of said primary switch means having a switch pole movable to complete and break a circuit,
  secondary switch means mounted on the floor of said housing,
  an actuating member adapted to move each of said switch poles individually, and
  a wand projecting from said housing, said wand being capable of moving said actuating member to actuate said primary switch means, said wand having a rod axially slidable relative to the actuating member to operate said secondary switch means.

9. The controller of claim 3 comprising at least one leg projecting downward from the cross-shaped member through an opening in the floor of said housing, and a block spring loaded against the floor of said housing and fastened to said leg so said cross-shaped member is movable pivotally against the spring loading on said block.

10. The controller of claim 9 comprising means responsive to rotation of said wand for moving the cross-shaped member to actuate all primary switch means concomitantly.

11. The controller of claim 10 comprising means responsive to rotation of said wand in the opposite direction for moving one of the poles of said secondary switch means to an intermediate position.

12. The controller of claim 1 comprising at least one leg projecting downward from said cross-shaped member through an opening in the floor of said housing, and a block spring loaded against the floor of said housing and fastened to said leg so said cross-shaped member is movable pivotally against the spring loading on said block.

13. The controller of claim 8 comprising at least one leg projecting downward from the actuating member through an opening in the floor of said housing, and a block spring loaded against the floor of said housing and fastened to said leg so said actuating member is movable pivotally against the spring loading on said block.

References Cited

UNITED STATES PATENTS

| | | | |
|---|---|---|---|
| 2,387,055 | 10/1945 | Bryant | 206—6 |
| 2,808,476 | 10/1957 | Elliott | 206—6 |
| 2,841,659 | 7/1958 | Eitel | 200—157 X |
| 2,916,566 | 12/1959 | Meyer et al. | 200—6 X |
| 3,277,248 | 10/1966 | Melvin | 200—6 |

ROBERT K. SCHAEFER, *Primary Examiner.*

H. J. HOHAUSER, *Assistant Examiner.*